United States Patent
Park

(10) Patent No.: US 11,863,048 B2
(45) Date of Patent: Jan. 2, 2024

(54) ROTOR CORE BALANCING STRUCTURE AND MOTOR INCLUDING THE SAME

(71) Applicants: Hyundai Motor Company, Seoul (KR); Kia Corporation, Seoul (KR)

(72) Inventor: Kyung Soo Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 107 days.

(21) Appl. No.: 17/644,036

(22) Filed: Dec. 13, 2021

(65) Prior Publication Data

US 2023/0017416 A1      Jan. 19, 2023

(30) Foreign Application Priority Data

Jul. 6, 2021   (KR) .......................... 10-2021-0088378

(51) Int. Cl.
*H02K 7/04*       (2006.01)
*H02K 1/276*      (2022.01)

(52) U.S. Cl.
CPC .............. *H02K 7/04* (2013.01); *H02K 1/276* (2013.01)

(58) Field of Classification Search
CPC ............ H02K 1/22; H02K 1/27; H02K 1/276; H02K 1/2766; H02K 7/00; H02K 7/003; H02K 7/04; H02K 7/08; H02K 7/083; H02K 15/00; H02K 15/16; H02K 17/00; H02K 17/16
See application file for complete search history.

(56) References Cited

U.S. PATENT DOCUMENTS

| | | | | |
|---|---|---|---|---|
| 2016/0294251 | A1* | 10/2016 | Fukasaku | ............ F04C 29/0085 |
| 2019/0386539 | A1* | 12/2019 | Mukai | ..................... H02K 7/04 |

FOREIGN PATENT DOCUMENTS

| | | | |
|---|---|---|---|
| CN | 112260434 A1 | * | 10/2016 |
| JP | H09121516 A | | 5/1997 |
| JP | 2002165406 A | | 6/2002 |
| JP | 2008236905 A | | 10/2008 |
| JP | 2015061327 A | | 3/2015 |
| KR | 20050054771 A | | 6/2005 |
| KR | 20060000182 A | | 1/2006 |
| KR | 20090009567 A | | 1/2009 |
| KR | 20110123575 A | | 11/2011 |
| KR | 20140035549 A | | 3/2014 |
| KR | 20140136556 A | | 12/2014 |
| KR | 20160041296 A | | 4/2016 |
| KR | 101724787 A | | 4/2017 |
| KR | 20170066868 A | | 6/2017 |
| KR | 20190098426 A | | 8/2019 |

* cited by examiner

*Primary Examiner* — Tran N Nguyen
(74) *Attorney, Agent, or Firm* — Slater Matsil, LLP

(57) ABSTRACT

An embodiment rotor includes a rotor core, a plurality of permanent magnets inserted into an outer circumference portion of the rotor core, and a balancing structure provided on an inner circumference portion of the rotor core, wherein the balancing structure has a preset shape for balancing. An embodiment method for correcting a rotation imbalance of a rotor includes forming a plurality of balancing structures having a preset shape along an inner circumference portion of a rotor core, wherein a plurality of permanent magnets is inserted into an outer circumference portion of the rotor core, identifying a mass imbalance point in the rotor core, and removing a balancing structure of the plurality of balancing structures at a position corresponding to the identified mass imbalance point.

20 Claims, 4 Drawing Sheets

ROTOR CORE BALANCING STRUCTURE AND MOTOR INCLUDING THE SAME

CROSS-REFERENCE TO RELATED APPLICATIONS

This application claims the benefit of Korean Patent Application No. 10-2021-0088378, filed on Jul. 6, 2021, which application is hereby incorporated herein by reference.

TECHNICAL FIELD

The present disclosure relates to a rotor core balancing structure and a motor including the same.

BACKGROUND

A motor converts received electric energy into kinetic energy to drive a machine, such as a vehicle. To this end, the motor includes a stator which is a part that receives electric energy and is fixed and a rotor which is a part that includes a permanent magnet and rotates. In other words, the rotor is rotated by the electromagnetic interaction with the stator.

The motor may be classified into a surface-mounted permanent magnet (SPM) type and an interior permanent magnet (IPM) type according to the placement of the permanent magnet installed on a rotor core. As the name suggests, the former has the permanent magnet disposed on a surface of the rotor, and the latter has the permanent magnet disposed inside the rotor.

As a driving motor for an eco-friendly vehicle, such as an electric vehicle, an interior permanent magnet synchronous motor (IPMSM) is generally used. This is because a vehicle requires robustness and a high output density according to a high-speed operation.

When a mass imbalance exists around a rotation axis of the rotor due to the insertion of the permanent magnet or the like, vibration and noise occur when the motor is operated, and durability and noise, vibration and harshness (NVH) performance of the motor may deteriorate. Therefore, a balancing operation for resolving the mass imbalance around the rotation axis of the rotor is performed.

The balancing of the rotor is performed by identifying a balance correction point through a mass distribution measurement and removing any point of a rotor plate corresponding to the balance correction point. This may be referred to as a "minus" balancing. Alternatively, there is also a "plus" balancing that inserts an additional mass into a point with a low mass.

Normally, the plus or minus balancing operation is performed for an end plate, which is a component separate from the rotor.

FIG. 1A illustrates an exemplary rotor 500. Referring to FIG. 1A, a shaft 520 that rotates together with a rotor core 510 to generate a rotation driving force is disposed inside the rotor core 510. End plates 530 are disposed on both sides of the rotor 500 in an axial direction of the rotor 500. As illustrated in FIG. 1B, the balancing, such as the minus (−) balancing that reduces the mass, is performed for the end plate $_{530.}$ However, if the end plate is added for the balancing, the addition causes costs, overall weight and size of the motor to increase.

Therefore, there is a need for a rotor with a structure capable of resolving the above problem.

The above information disclosed in this Background section is only for enhancement of understanding of the background of the disclosure and accordingly it may include information that does not form the prior art that is already known in this country to a person of ordinary skill in the art.

Korean Patent No. 10-2108925 (registered on May 4, 2020) may provide information related to concepts described in the present disclosure.

SUMMARY

The present disclosure relates to a rotor core balancing structure and a motor including the same. Particular embodiments relate to a rotor and to a rotor applied to a permanent magnet motor.

Embodiments of the present disclosure can solve problems associated with the related art, and an embodiment of the present disclosure provides a rotor that facilitates a balancing operation.

Further, another embodiment of the present disclosure provides a rotor capable of reducing the weight, size, and cost of a motor.

The embodiments of the present disclosure are not limited to the aforementioned embodiments, and other embodiments not mentioned may be clearly understood by those skilled in the art to which the present disclosure pertains (hereinafter referred to as 'those skilled in the art') from the following description.

The embodiments of the present disclosure may perform functions to be described later as follows.

A rotor according to some exemplary embodiments of the present disclosure includes a rotor core, a plurality of permanent magnets inserted into an outer circumference portion of the rotor core, and a balancing structure provided on an inner circumference portion of the rotor core, in which the balancing structure has a preset shape for balancing.

A method for correcting a rotation imbalance of a rotor according to some exemplary embodiments of the present disclosure includes forming a plurality of balancing structures having a preset shape along an inner circumference portion of a rotor core with a plurality of permanent magnets inserted into an outer circumference portion of the rotor core, identifying a mass imbalance point in the rotor core, and removing a part of a balancing structure at a position corresponding to the identified imbalance point.

Embodiments of the present disclosure provide the rotor that facilitates the balancing operation.

Embodiments of the present disclosure provide the rotor capable of reducing the weight, size, and cost of the motor.

The embodiments of the present disclosure are not limited to the aforementioned embodiments, and other embodiments not mentioned may be clearly recognized by those skilled in the art from the following description.

It is understood that the term "automotive" or "vehicular" or other similar term as used herein is inclusive of motor vehicles in general such as passenger automobiles including spoils utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of embodiments of the disclosure are discussed infra.

BRIEF DESCRIPTION OF THE DRAWINGS

The above and other embodiments of the present disclosure will now be described in detail with reference to certain exemplary examples thereof illustrated in the accompanying drawings which are given hereinbelow by way of illustration only, and thus are not limitative of the present disclosure, and wherein.

Figure 1A:
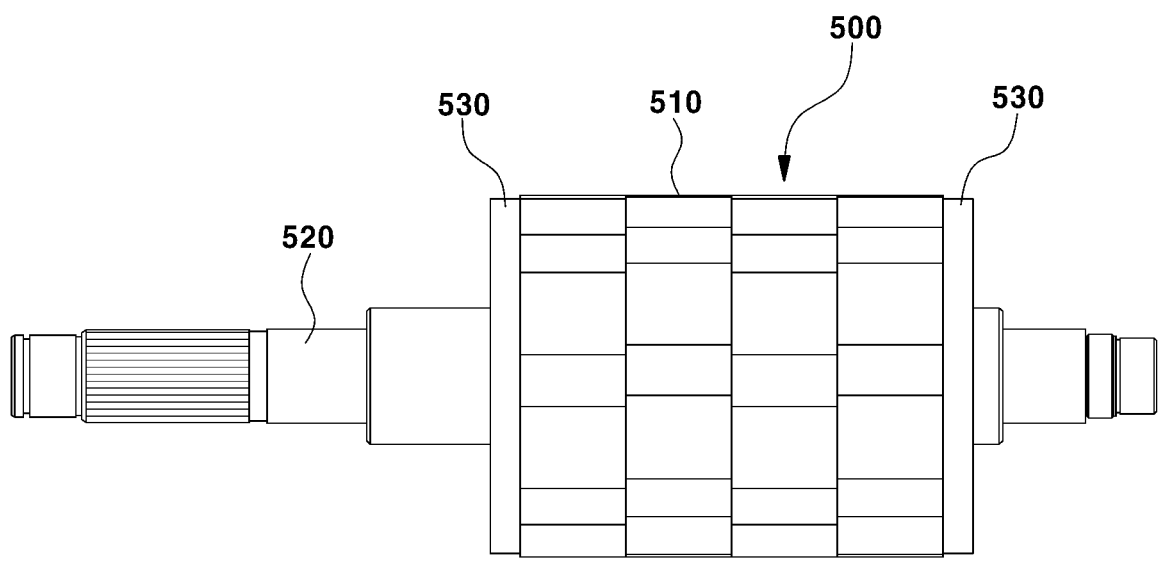
FIG. 1A illustrates a rotor for an exemplary motor.
Figure 1B:
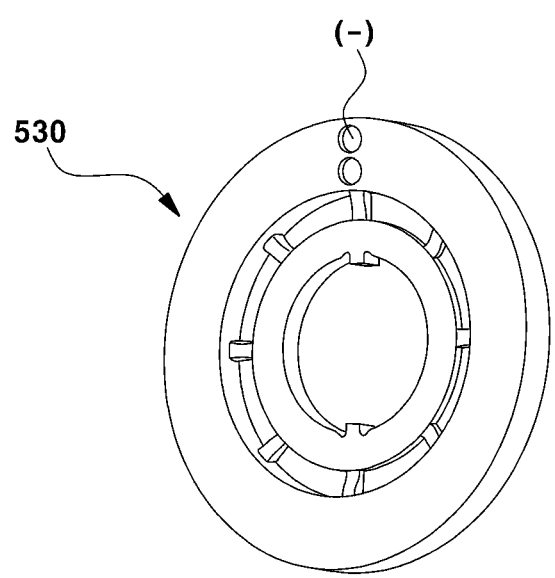
FIG. 1B illustrates an end plate of FIG. 1A.

It should be understood that the appended drawings are not necessarily to scale, presenting a somewhat simplified representation of various preferred features illustrative of the basic principles of embodiments of the disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent sections of the present disclosure throughout the several figures of the drawings.

DETAILED DESCRIPTION OF ILLUSTRATIVE EMBODIMENTS

Hereinafter, preferred embodiments of the present disclosure will be described in detail with reference to the accompanying drawings. Specific structures or functions described in the embodiments of the present disclosure are merely for illustrative purposes. Embodiments according to the concept of the present disclosure may be implemented in various forms, and it should be understood that they should not be construed as being limited to the embodiments described in the present specification, but include all modifications, equivalents, or substitutes included in the spirit and scope of the present disclosure.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

Hereinafter, embodiments of the present disclosure will be described in detail with reference to the accompanying drawings.

Figure 2:
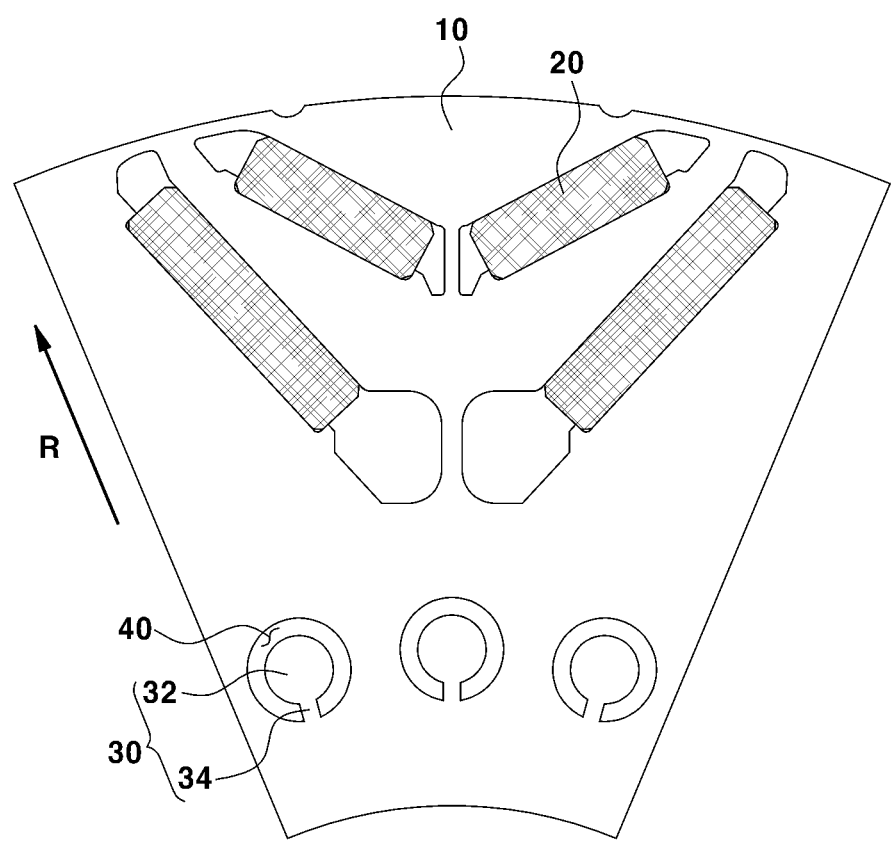
FIG. 2 is a partial front diagram of a rotor according to some embodiments of the present disclosure.
Figure 3:
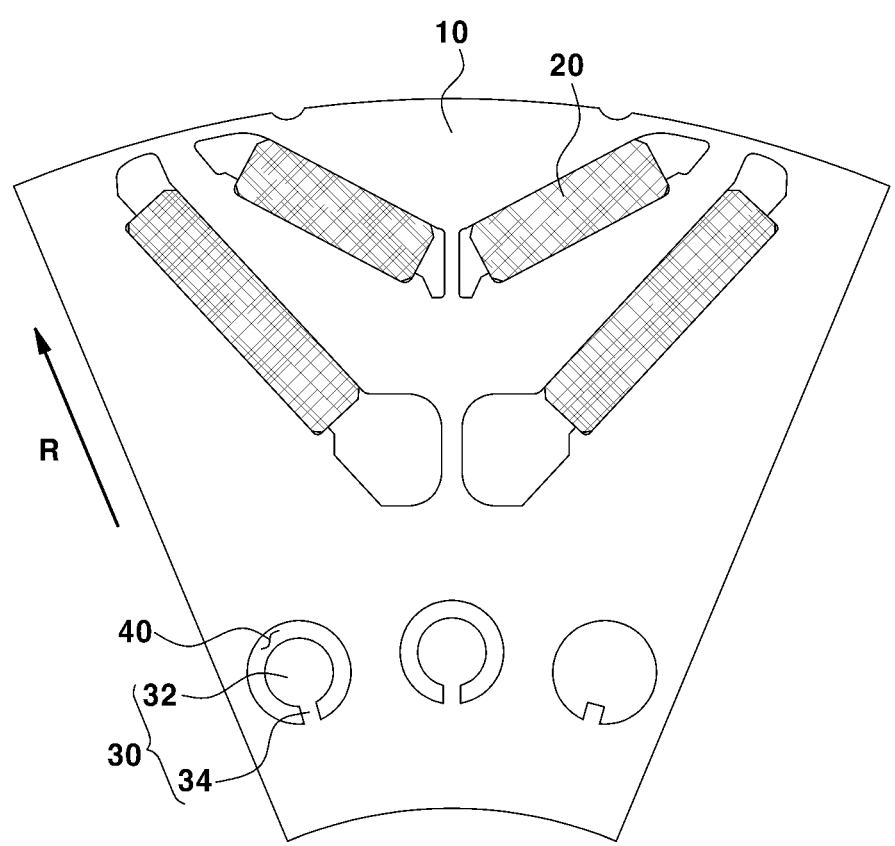
FIG. 3 illustrates a state where a balancing is performed in FIG. 2.

As illustrated in FIGS. 2 and 3, a rotor according to an embodiment of the present disclosure includes a rotor core 10, a plurality of permanent magnets 20, and one or more balancing structures 30.

The permanent magnets 20 are interior mounted and inserted into the rotor core 10. In particular, an embodiment of the present disclosure provides the rotor for an interior permanent magnet synchronous motor.

Each permanent magnet 20 is inserted at a preset position of the rotor core 10. The permanent magnets 20 may be disposed at a preset interval and positioned along the circumference of the rotor core 10. In particular, the permanent magnets 20 are mounted on an outer circumference portion of the rotor core 10.

The balancing structure 30 is provided on the rotor core 10 in advance. In other words, the balancing structure 30 may be formed in advance before the presence of mass imbalance in the rotor core 10 is determined. For example, the balancing structure 30 may be included in a mold of the rotor core 10. The part of the balancing structure 30 may be easily removed when it is identified that the mass imbalance exists. When the balancing structure 30 is formed as described above, only the corresponding portion may be easily removed without modifying a neighboring shape upon balancing operation.

The balancing structure 30 may be provided on an inner circumference portion of the rotor core 10. A certain gap 40 is provided between the balancing structure 30 and the rotor core 10. According to an implementation example of an embodiment of the present disclosure, the balancing structure 30 includes a first portion 32 and a second portion 34.

The first portion 32 is formed to be spaced apart from the rotor core 10 by the gap 40. As a non-limiting example, a cross section of the first portion 32 may have a circular shape. In other words, the first portion 32 having the circular cross section extends in the axial direction of the rotor core 10.

The second portion 34 connects the first portion 32 to the rotor core 10. The first portion 32 extends the gap 40 to connect the first portion 32 to the rotor core 10. According to an implementation example of an embodiment of the present disclosure, the gap 40 is substantially similar to a C shape.

According to some embodiments of the present disclosure, the balancing structure 30 includes the first portion 32 having the circular cross section and the second portion 34 having a rectangular cross section that has a cross section smaller than that of the first portion 32. When the balancing structure 30 has such a shape, the balancing structure 30, that is, the first portion 32 may be very easily separated from the rotor core 10, and it is also possible to largely increase a balancing speed.

According to an implementation example of an embodiment of the present disclosure, the balancing structure 30 is formed integrally with the rotor core 10. Therefore, according to embodiments of the present disclosure, the end plate required for the balancing may be omitted, thereby reducing the weight and size of the motor.

The balancing structure 30 is formed at a position with a low magnetic flux density. In particular, the balancing structure 30 may be provided around the inner circumference portion of the rotor core 10. It is confirmed that the portion between the permanent magnet and the inner circumference of the rotor core 10 has a low magnetic flux density. According to embodiments of the present disclosure, the balancing structure 30 is formed on the portion with the low magnetic flux density, thereby not interfering with the flow of a magnetic path and barely affecting the output.

According to an implementation example of an embodiment of the present disclosure, the rotor core 10 includes a plurality of balancing structures 30. According to embodiments of the present disclosure, the plurality of balancing structures 30 may be provided. The plurality of balancing structures 30 may be spaced apart from each other at predefined intervals along the inner circumference portion of the rotor core 10. As a result, it is possible to remove the part of the balancing structure 30 at a position where mass imbalance exists, thereby resolving the imbalance. According to embodiments of the present disclosure, the balancing structure 30 may be provided on the entire circumference of the inner circumference portion of the rotor core 10 to increase the possibility that a position where the balancing is required matches with the position of the balancing structure 30. Therefore, it is possible to resolve the imbalance of the motor easily and more accurately. According to embodiments of the present disclosure, the balancing structure 30 is provided on the inner circumference portion of the rotor core 10 regardless of weight reduction holes generally formed in the motor for reducing the weight of the motor. However, the balancing structure 30 may also result in reducing the weight of the motor.

The rotor including the specific shape, number, and placement of the balancing structure 30 according to embodiments of the present disclosure may obtain the effective balancing results even while facilitating the balancing operation.

According to an implementation example of an embodiment of the present disclosure, the first portion 32 and the second portion 34 extend outward in a radial direction (R) of the rotor core 10. In other words, the first portion 32 and the second portion 34 may be formed outward in the radial direction of the rotor core 10 around the rotation axis of the rotor core 10.

Figure 4:
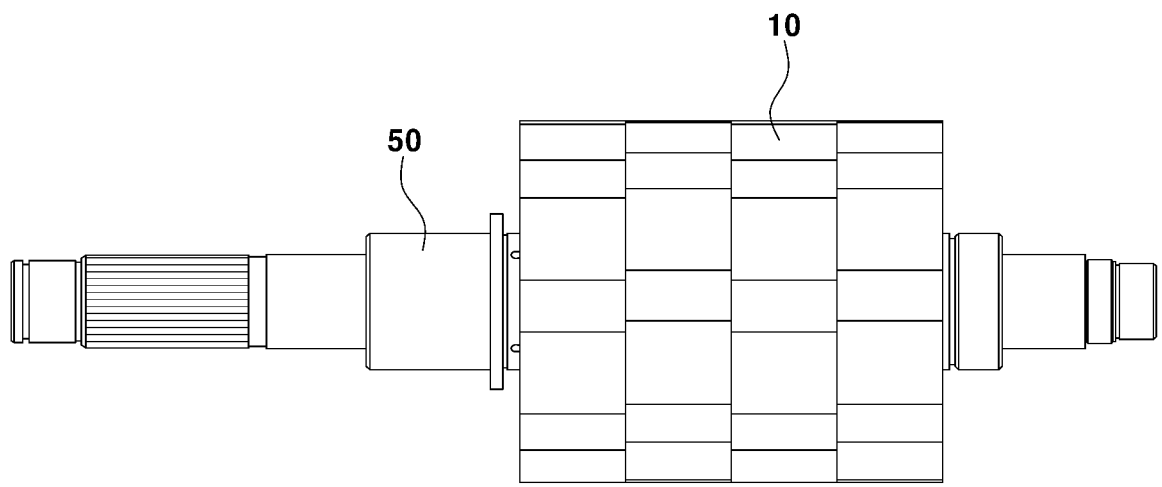
FIG. 4 is a side diagram of the rotor according to some embodiments of the present disclosure.

Referring to FIG. 4, as described above, the rotor according to embodiments of the present disclosure does not include the end plate. Since the balancing against the mass imbalance is performed by the balancing structure previously formed on the rotor core 10, it is not necessary to provide the end plate. As a result, according to embodiments of the present disclosure, it is possible to reduce the cost, weight, and size of the motor.

Figure 5:
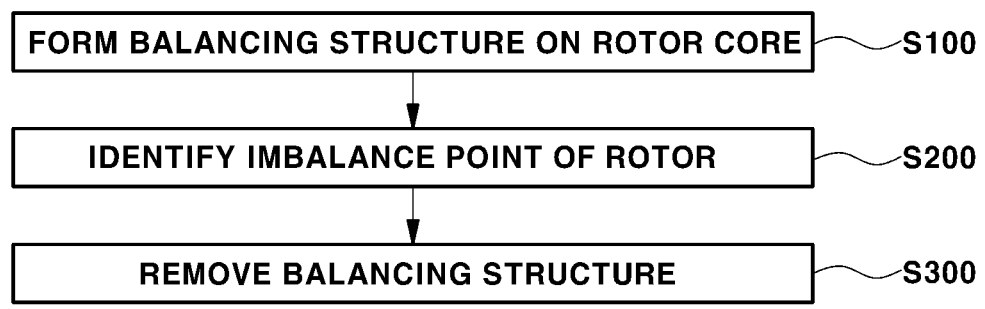
FIG. 5 is a flowchart illustrating a method for correcting a rotation imbalance of the rotor according to some embodiments of the present disclosure.

As illustrated in FIG. 5, a method for correcting a rotation imbalance of the rotor according to an embodiment of the present disclosure may be executed by a series of steps.

In step S100, the balancing structure 30 is formed on the rotor core 10. The balancing structure 30 is provided on the inner circumference portion of the rotor core 10 where the magnetic flux density is small, or between the permanent magnet 20 and the inner circumference of the rotor core 10. Further, a plurality of balancing structures 30 may be formed along the circumference of the rotor core 10. The rotor core 10 is formed in a circular projection shape as described above. By removing the part of the balancing structure or the first portion 32, which is the circular portion, upon balancing, it is possible to perform the balancing very simply and easily.

In step S200, a mass imbalance point of the rotor core 10 is identified (S200). The imbalance point may be determined by the generally known method.

In step S300, the part of the balancing structure 30 at the corresponding imbalance point is removed. According to an embodiment of the present disclosure, the minus balancing that reduces the mass may be performed, thereby also helping to reduce the weight of the motor.

The present disclosure described above is not limited to the aforementioned exemplary embodiments and the accompanying drawings, and it will be apparent to those skilled in the art to which the present disclosure pertains that various substitutions, modifications, and changes thereof may be made without departing from the technical spirit of the present disclosure.

What is claimed is:

1. A rotor comprising:
a rotor core;
a plurality of permanent magnets inserted into an outer circumference portion of the rotor core; and
a plurality of balancing structures provided on an inner circumference portion of the rotor core, the balancing structures being disposed along a circumferential direction of the rotor core, wherein each balancing structure of the plurality of the balancing structures comprises a first portion formed to be spaced apart from the rotor core by a predetermined gap and a second portion connecting the first portion to the rotor core, and wherein one or more of the first portions in the plurality of the balancing structures are selectively removable for balancing of the rotor.

2. The rotor of claim 1, wherein the second portion extends outward in a radial direction of the rotor core.

3. The rotor of claim 1, wherein the first portion is positioned further outward in a radial direction of the rotor core with respect to the second portion.

4. The rotor of claim 1, wherein a cross section of the first portion has a circular shape.

5. The rotor of claim 1, wherein the rotor is provided for an interior permanent magnet motor.

6. The rotor of claim 1, wherein the plurality of the balancing structures are disposed to be spaced apart from each other in the circumferential direction of the rotor core.

7. The rotor of claim 1, wherein the plurality of the balancing structures are formed integrally with the rotor core.

8. A motor comprising:
a stator configured to receive electric energy; and
a rotor comprising:
a rotor core;
a plurality of permanent magnets inserted into an outer circumference portion of the rotor core; and
a plurality of balancing structures provided on an inner circumference portion of the rotor core and disposed along a circumferential direction of the rotor core, wherein each balancing structure of the plurality of the balancing structures comprises a first portion formed to be spaced apart from the rotor core by a predetermined gap and a second portion connecting the first portion to the rotor core, and wherein one or more of the first portions are selectively removable for balancing of the rotor.

9. The motor of claim 8, wherein the motor does not comprise an end plate of the rotor.

10. The motor of claim 8, wherein the second portion extends outward in a radial direction of the rotor core.

11. The motor of claim 8, wherein the first portion is positioned further outward in a radial direction of the rotor core with respect to the second portion.

12. The motor of claim 8, wherein a cross section of the first portion has a circular shape.

13. The motor of claim 8, wherein the plurality of the balancing structures are disposed to be spaced apart from each other in the circumferential direction of the rotor core.

14. The motor of claim 8, wherein the plurality of the balancing structures are formed integrally with the rotor core.

15. A method for correcting a rotation imbalance of a rotor, the method comprising:
    forming a plurality of balancing structures along an inner circumference portion of a rotor core, each of the plurality of the balancing structures comprising a first portion formed to be spaced apart from the rotor core by a predetermined gap and a second portion connecting the first portion to the rotor core, wherein a plurality of permanent magnets is inserted into an outer circumference portion of the rotor core;
    identifying a mass imbalance point in the rotor core; and
    selectively removing one or more of the first portions of one or more of the balancing structures at a position corresponding to the identified mass imbalance point.

16. The rotor of claim 1, wherein each balancing structure has a predetermined symmetrical shape for balancing mass-imbalance of the rotor.

17. The rotor of claim 1, wherein the plurality of the balancing structures are disposed to be spaced apart from each other at predetermined intervals in the circumferential direction of the rotor core.

18. The motor of claim 8, wherein each balancing structure has a predetermined symmetrical shape for balancing mass-imbalance of the rotor.

19. The motor of claim 8, wherein the plurality of the balancing structures are disposed to be spaced apart from each other at predetermined intervals in the circumferential direction of the rotor core.

20. The method of claim 15, wherein a cross section of the first portion has a circular shape.

* * * * *